United States Patent
Tagami et al.

(12)

(10) Patent No.: US 6,761,238 B2
(45) Date of Patent: Jul. 13, 2004

(54) VEHICLE BODY STRUCTURE OF TRICYCLE

(75) Inventors: Takuya Tagami, Saitama (JP); Takashi Ozeki, Saitama (JP); Mitsuo Nakagawa, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 21 days.

(21) Appl. No.: 09/927,514

(22) Filed: Aug. 13, 2001

(65) Prior Publication Data

US 2002/0027030 A1 Mar. 7, 2002

(30) Foreign Application Priority Data

Sep. 6, 2000 (JP) ........................................ 2000-270470

(51) Int. Cl.⁷ ................................................. B60K 5/02
(52) U.S. Cl. ...................... 180/210; 180/215; 180/311; 180/315; 280/400; 280/483; 280/124.111; 280/124.177
(58) Field of Search ................................ 180/210, 215, 180/311, 315; 280/400, 474, 483, 124.103, 124.111, 124.177, FOR 131, FOR 133, FOR 173

(56) References Cited

U.S. PATENT DOCUMENTS

| 4,316,520 A | * | 2/1982 | Yamamoto et al. ......... 180/215 |
| 4,356,876 A | * | 11/1982 | Watanabe et al. ........... 180/210 |
| 4,487,282 A | * | 12/1984 | Wakatsuki et al. .......... 180/210 |

FOREIGN PATENT DOCUMENTS

| JP | 1-233560 | | 5/1989 | |
| JP | 3-109191 | * | 5/1991 | ........ 280/FOR 133 |

* cited by examiner

*Primary Examiner*—Eric Culbreth
(74) *Attorney, Agent, or Firm*—Birch, Stewart, Kolasch & Birch, LLP

(57) ABSTRACT

A joint case includes a flange, a joint shaft extending from the flange, and a case main body fitted to the joint shaft. The flange is fitted to a rear portion of a front vehicle body, whereas the side of the case main body of the joint case is fitted to a rear vehicle body. With the above construction of the joint case, the distance between the front vehicle body and the rear vehicle body can be reduced, and a reduction in the overall length of the tricycle can be obtained.

17 Claims, 15 Drawing Sheets

VEHICLE BODY STRUCTURE OF TRICYCLE

BACKGROUND OF THE INVENTION

This application claims priority to Japanese patent application No. 2000-270470, filed on Sep. 6, 2000, the contents of which are hereby incorporated by reference.

1. Field of the Invention

The present invention relates to a vehicle body structure capable of reducing the overall length of a tricycle.

2. Description of Background Art

A vehicle body structure of a tricycle, in which a front vehicle body fitted with a front wheel and a rear vehicle body fitted with rear wheels are rollably connected to each other by a connecting portion, has been disclosed in Japanese Patent Publication No. Hei 1-23356, entitled "Parking Lock Device for Oscillation Type Tricycle".

FIGS. 1 and 2 of the above-mentioned publication are re-printed herein as FIGS. 16 and 17 of the present invention. A description will now be provided with reference to FIGS. 16 and 17 of the present invention. FIG. 16 of the present invention illustrates a major part of the original FIG. 1. It should be noted that the reference symbols in FIGS. 16 and 17 do not correspond with the above-mentioned publication.

FIG. 16 is a side view of a major part of a tricycle according to the background art. An oscillation type tricycle 200 comprises a front vehicle body 201 on the front wheel side and a rear vehicle body 202 on the rear wheel side, which constitute the vehicle body. Fitting boss portions 204, 204 (fitting boss portion 204 on the far side is not shown) of an oscillating joint 203 are vertically movably fitted to a rear portion of a lower portion of the front vehicle body 201 by a pin 206. A rear frame 207 is fitted to a rear portion of the oscillating joint 203. Furthermore, rear wheels 208 are fitted to the side of the rear wheel 207. Accordingly, the front vehicle body 201 and the rear vehicle body 202 can be relatively rolled by the oscillating joint 203.

FIG. 17 is a sectional view showing the oscillating joint according to the background art. A support shaft 212 is rollably fitted to a lower case 211 and an upper case (not shown) of the oscillating joint 203. A roll lock mechanism 213 for restricting relative rotation of the case side (lower case 211 and upper case) and the support shaft 212 is provided at the front side of the support shaft 212. Fitting boss portions 204, 205 are disposed at the front end of the lower case 211 through arms 214, 215. The rear frame 207 is fitted to a rear portion of the support shaft 212. Furthermore, an operating cable 216 for operating the roll lock mechanism 213 and locking (braking) the rear wheels 208 is laid from the front vehicle body 201 to the rear vehicle body 202 through the oscillating joint 203. It should be noted that each component of the "roll lock mechanism 213" is disclosed in FIG. 2 of the above-mentioned publication, but the term "roll lock mechanism 213" is newly added for the convenience of description.

In FIG. 17, the oscillating joint 203 is so constructed that the roll lock mechanism 213 is disposed on the front side of the support shaft 212, the arms 214, 215 are extended to the front side of the vehicle from the lower case 211, and the fitting boss portions 204, 205 are provided at the front ends of the arms 214, 215. Accordingly, the length of the oscillating joint 203 in the front-rear direction of the vehicle is increased. As a result, the spacing between the front vehicle body 201 and the rear vehicle body 202 shown in FIG. 16 is increased. Accordingly, the overall length of the tricycle is increased.

The tricycle 200 is typically used for delivery purposes. Therefore, the tricycle 200 would be used in narrow alleys. Accordingly, those having a small overall length and capable of making sharp turns are desirable.

SUMMARY OF THE INVENTION

Accordingly, an object of the present invention is to provide a vehicle body structure of a tricycle, which can reduce the overall length of the tricycle.

In order to attain the above object, according to a first aspect of the present invention, a vehicle body structure of a tricycle comprises a front vehicle body fitted with a front wheel, a rear vehicle body fitted with rear wheels, and a connecting portion by which the front vehicle body and the rear vehicle body are relatively rollably connected to each other, wherein the connecting portion comprises a flange, a shaft extended from the flange, and a bearing fitted to the shaft, and the flange is fitted to a rear portion of the front vehicle body, whereas the bearing side of the connecting portion is fitted to the rear vehicle body.

In the above construction, the shaft is extended from the flange, whereby the connecting portion is made to be shorter than in the background art. Accordingly, a reduction in the overall length of the tricycle is obtained.

According to a second aspect of the present invention, a vehicle body structure of a tricycle comprises a front vehicle body fitted with a front wheel, a rear vehicle body fitted with rear wheels, and a connecting portion in which the front vehicle body and the rear vehicle body are connected through a shaft extending substantially in the front-rear direction of the vehicle and a bearing, the front vehicle body and the rear vehicle body being relatively rollably connected to each other by the connecting portion, wherein a roll lock mechanism for restricting relative rotation of the shaft and the bearing is disposed on a lateral side of the shaft, and a fitting portion for fitting the rear vehicle body to the bearing is provided on a side of the bearing.

Since the roll lock mechanism is disposed on a lateral side of the shaft, the connecting portion is made shorter than in the background art in which the roll lock mechanism is disposed on an extension of the shaft and the distance between the front vehicle body and the rear vehicle body is reduced. Accordingly, a reduction in the overall length of the tricycle is obtained. Furthermore, the turning performance of the tricycle is enhanced.

In addition, the fitting portion for fitting the rear vehicle body is provided on a side of the bearing, and the bearing and the rear vehicle body are overlapped with each other. Accordingly, the overall length of the tricycle can be further reduced.

According to a third aspect of the present invention, the roll lock mechanism comprises an arm-like or flange-like side projecting member projecting sideways from the shaft, a lock member swingably fitted on the side of the bearing to be engaged with a recess and projection portion provided on the side projecting member, and a cable fitting portion provided at an end portion of the lock member so as to fit a cable for swinging the lock member.

Since the side projecting member projects sideways from the shaft, the lock member and the cable can be located at such positions as not to interfere with the shaft, and the degree of freedom in laying out the roll lock mechanism and the cable can be enhanced. Therefore, the roll lock mechanism and the cable can be disposed at appropriate spaces according to the shape and size of the front and rear vehicle bodies and accessories fitted to the front and rear vehicle bodies.

According to a fourth aspect of the present invention, the rear vehicle body is provided with a rear wheel lock mechanism for locking the rear wheels, the front vehicle body is provided with a parking lever for operating the rear wheel lock mechanism, and a front half portion of the cable is laid between the parking lever and the rear wheel lock mechanism, whereas a rear half portion of the cable is laid between the rear wheel lock mechanism and the roll lock mechanism.

Since the front half portion of the cable is laid between the front vehicle body and the rear vehicle body, torsion of the cable due to the relative rolling of the front vehicle body and the rear vehicle body is absorbed in a larger distance as compared with the background art. Accordingly, an unnecessary burden is not applied to the cable. Furthermore, the cable becomes advantageous with regard to bending. Accordingly, replacement of the cable or the like is reduced, and maintenance cost of the tricycle can be suppressed.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
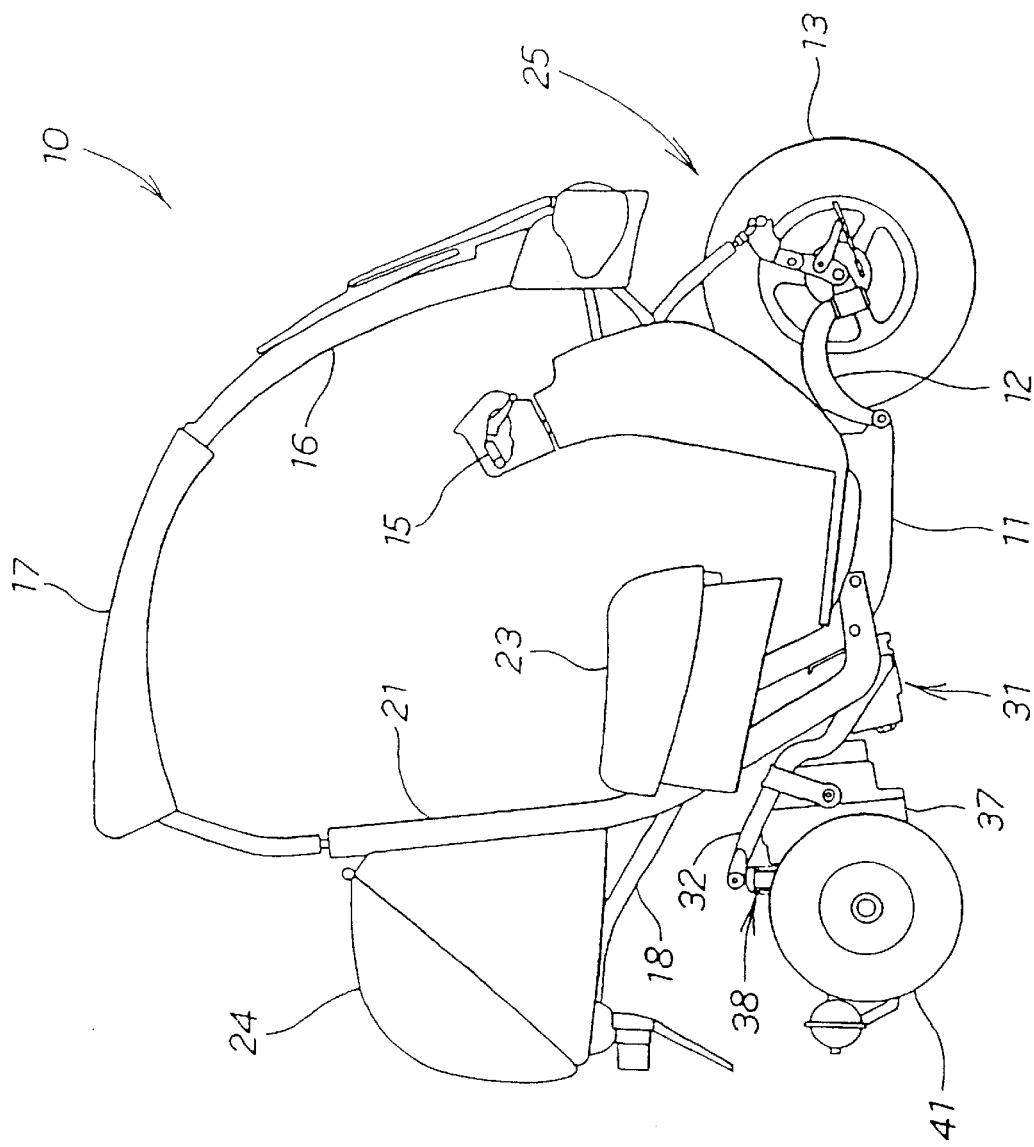
FIG. 1 is a side view of a tricycle to which the vehicle body structure according to the present invention is applied.

An embodiment of the present invention will now be described with reference to the accompanying drawings. It should be noted that the drawings should be viewed in accordance with the orientation of the reference numerals.

FIG. 1 is a side view of a tricycle to which the vehicle body structure according to the present invention is applied. In the tricycle 10, a front swing arm 12 is vertically movably fitted to a lower portion of a front portion of a vehicle body frame 11. A front wheel 13 is fitted to the front end of the front swing arm 12 rotatably and leftwardly and rightwardly movable. A handle 15 is rotatably fitted to an upper portion of the vehicle body frame 11. A wind screen 16 is fitted to an upper portion of the vehicle body frame 11. A front portion of a roof 17 is fitted to the top end of the wind screen 16. Rear frames 18, 18 (the rear frame 18 on the far side is not shown) are extended in a slanting manner rearwardly and upwardly from a rear portion of the vehicle body frame 11. Poles 21, 21 (pole 21 on the far side is not shown) for fitting a rear portion of the roof 17 is extended upward from a rear portion of the vehicle body frame 11. Furthermore, a seat 23 and a luggage box 24 are fitted to the rear frames 18, 18 and the poles 21, 21. This construction constitutes a front vehicle body 25 of the tricycle 10.

Figure 2:
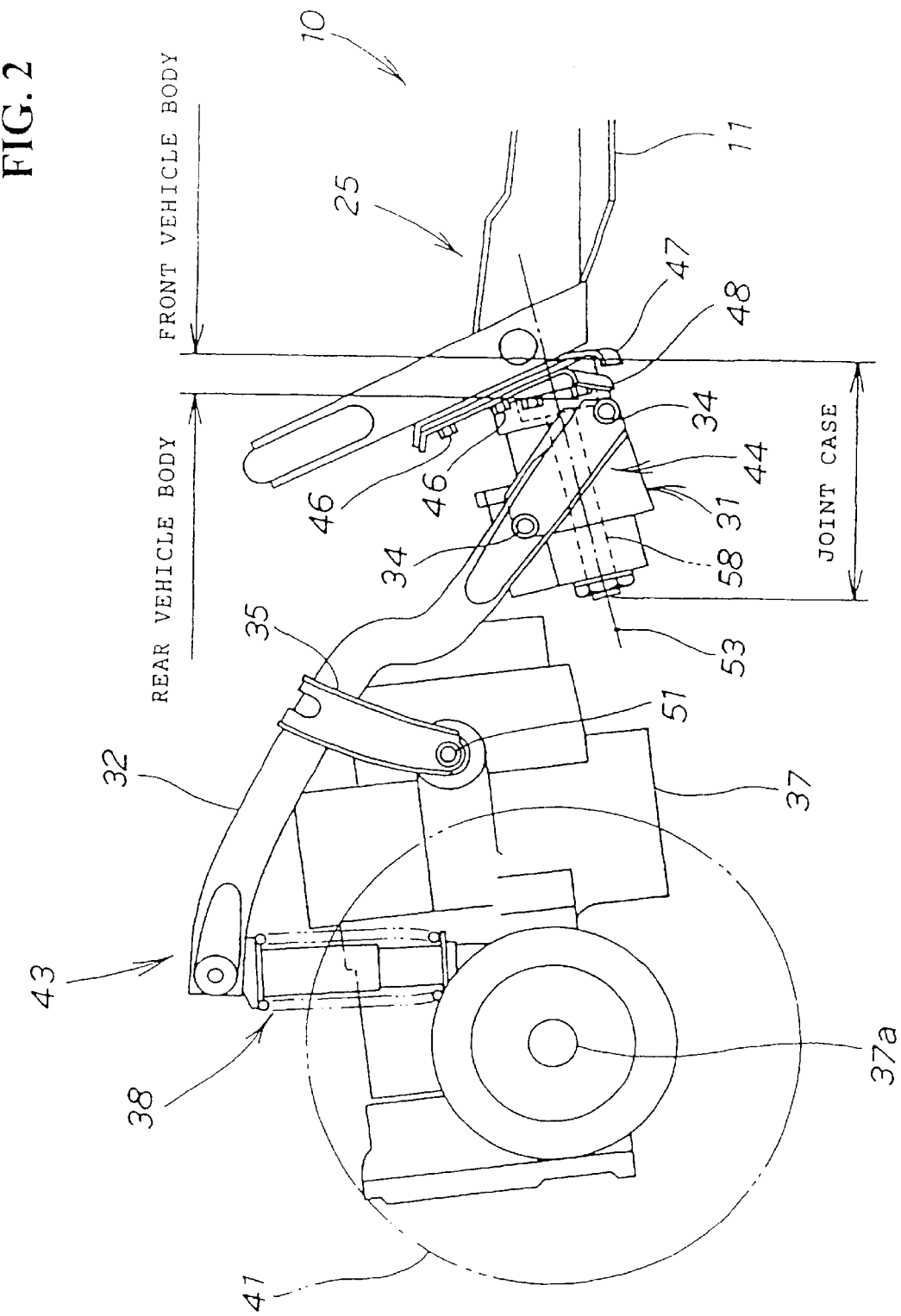
FIG. 2 is a side view of a rear portion of the tricycle according to the present invention.

FIG. 2 is a side view of a rear portion of the tricycle according to the present invention. In the tricycle 10, a joint case 31 acts as a connecting portion for connecting the front vehicle body 25 described referring to FIG. 1 and a rear vehicle body described below. The joint case 31 is fitted to the rear end of a lower portion of the vehicle body frame 11. A left-right pair of rear arms 32, 32 (the rear arm 32 on the far side is not shown) is fitted to side surfaces of the joint case 31 by bolts 34 ... (the mark ... indicates plurality, here arid hereinbelow). Side portions of a power unit 37 are fitted to intermediate portions of the rear arms 32, 32 swingably through brackets 35, 35 (bracket 35 on the far side is not shown). The power unit 37 is fitted to rear end portions of the rear arms 32, 32 through a rear cushion unit 38. Rear wheels 41, 41 (rear wheel 41 on the far side is not shown) are fitted to an output shaft 37a of the power unit 37. This construction disposed on the rear side of the joint case 31 just described constitutes a rear vehicle body 43 of the tricycle 10. Symbols 44, 44 (symbol 44 on the far side is not shown in FIG. 2) denote fitting portions (specifically, fitting surfaces and female screws for engagement with the screws 34) provided at side surfaces of the joint case 31 for fitting the rear vehicle body 43 (specifically, rear arms 32, 32) to the joint case 31.

The joint case 31 is so constructed that the front vehicle body 25 and the rear vehicle body 43 are connected to each other by a shaft extending substantially in the front-rear direction of the vehicle and a bearing (or the side of the bearing), whereby the front vehicle body 25 and the rear vehicle body 43 are relatively rollably connected. At the time of parking, the relative rolling of the front vehicle body 25 and the rear vehicle body 43 can be locked. Furthermore, flanges 47, 48 for fitting to a rear end portion of a lower portion of the vehicle body frame 11 by bolts 46 . . . are provided at a front portion of the joint case 31.

The power unit 37 swings with support shafts 51, 51 (support shaft 51 on the far side is not shown) as a center. A rear cushion unit 38 absorbs the shock exerted on the power unit 37, the front vehicle body 25 and the rear vehicle body 43 when the power unit 37 swings. Numeral 53 denotes an axis of a joint shaft 58 (described later) contained in the joint case 31.

Figure 3:
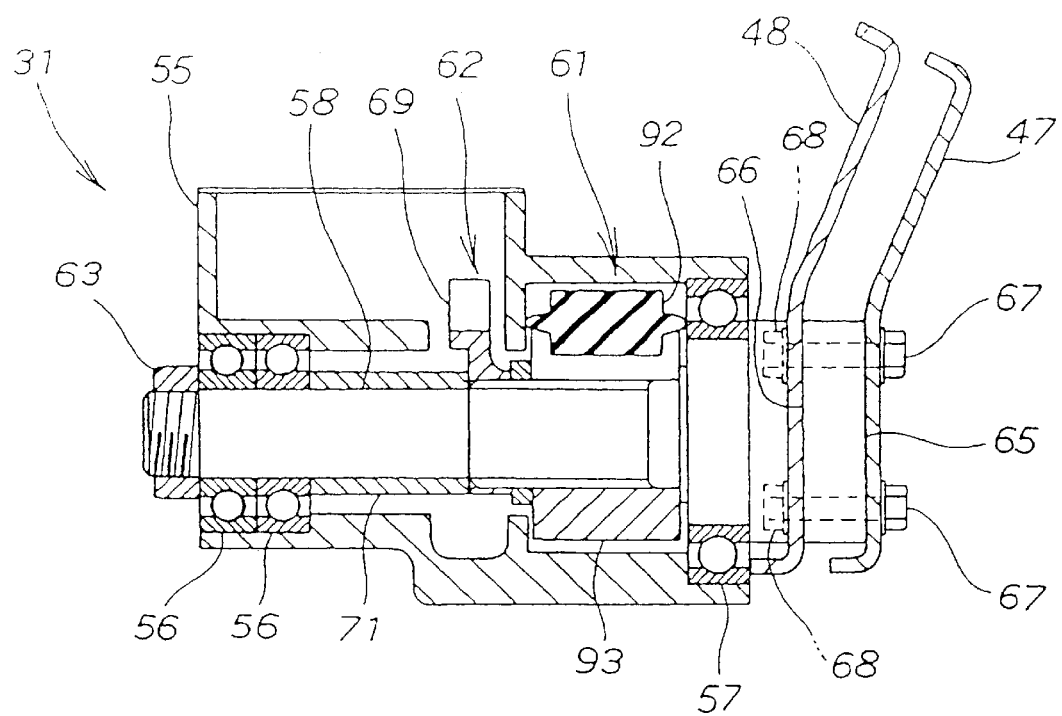
FIG. 3 is a sectional view of a joint case of the tricycle according to the present invention.

FIG. 3 is a sectional view of the joint case of the tricycle according to the present invention.

The joint case 31 comprises a case main body 55, the joint shaft 58 supported on the case main body 55 through bearings 56, 56, 57, the above-mentioned flanges 47, 48 fitted to a front portion of the joint shaft 58, a damper portion 61 disposed intermediately between the case main body 55 and the joint shaft 58, and a roll lock mechanism 62 which will be detailed later. Numeral 63 denotes a nut for preventing the joint shaft 58 from slipping off.

The case main body 55 supports the joint shaft 58 through the bearings 56, 56, 57. Accordingly, the case main body 55 can broadly be considered to be a bearing itself, especially where the bearings 56, 56, 57 are not used and the joint shaft 58 is supported directly by the case main body 55. Tn this case, the case main body 55 is a genuine bearing (slide bearing).

The joint shaft 58 is provided at its front portion with flange fitting surfaces 65, 66. The flange 47 is fitted to the flange fitting surface 65, while the flange 48 is fitted to the flange fitting surface 66, by co-fastening with bolts 67 . . . and nuts 68 . . . .

The roll lock mechanism 62 comprises a side projecting member 69 which has a sector shaped portion projecting toward the lateral side of the joint shaft 58 and which is serration-connected (or spline-connected) to the joint shaft 58. Numeral 71 denotes a collar intermediately provided between the bearing 56 and the side projecting member 69.

As has been described above referring to FIGS. 2 and 3, the present invention resides in a vehicle body structure of the tricycle 10 (See FIG. 1) comprising the front vehicle body 25 fitted with the front wheel 13 (See FIG. 1), the rear vehicle body 43 fitted with the rear wheels 41, 42 (symbol 42 is not shown), and the joint case 31 by which the front vehicle body 25 and the rear vehicle body 43 are relatively rollably connected, characterized in that the joint case 31 comprises the flanges 47, 48, the joint shaft 58 extended from the flanges 47, 48, and the case main body 55 fitted to the joint shaft 58, and the flanges 47, 48 are fitted to a rear portion of the front vehicle body 25 whereas the case main body 55 of the joint case 31 is fitted to the rear vehicle body 43.

With the structure in which the joint shaft 58 is extended from the flanges 47, 48, the joint case 31 can be made to be shorter as compared with the conventional structure in which a fitting boss portion is provided at the front end of a lower case through an arm and the fitting boss portion is fitted to the front vehicle body by a pin. Accordingly, a reduction in the overall length of the tricycle 10 can be obtained.

Figure 4:
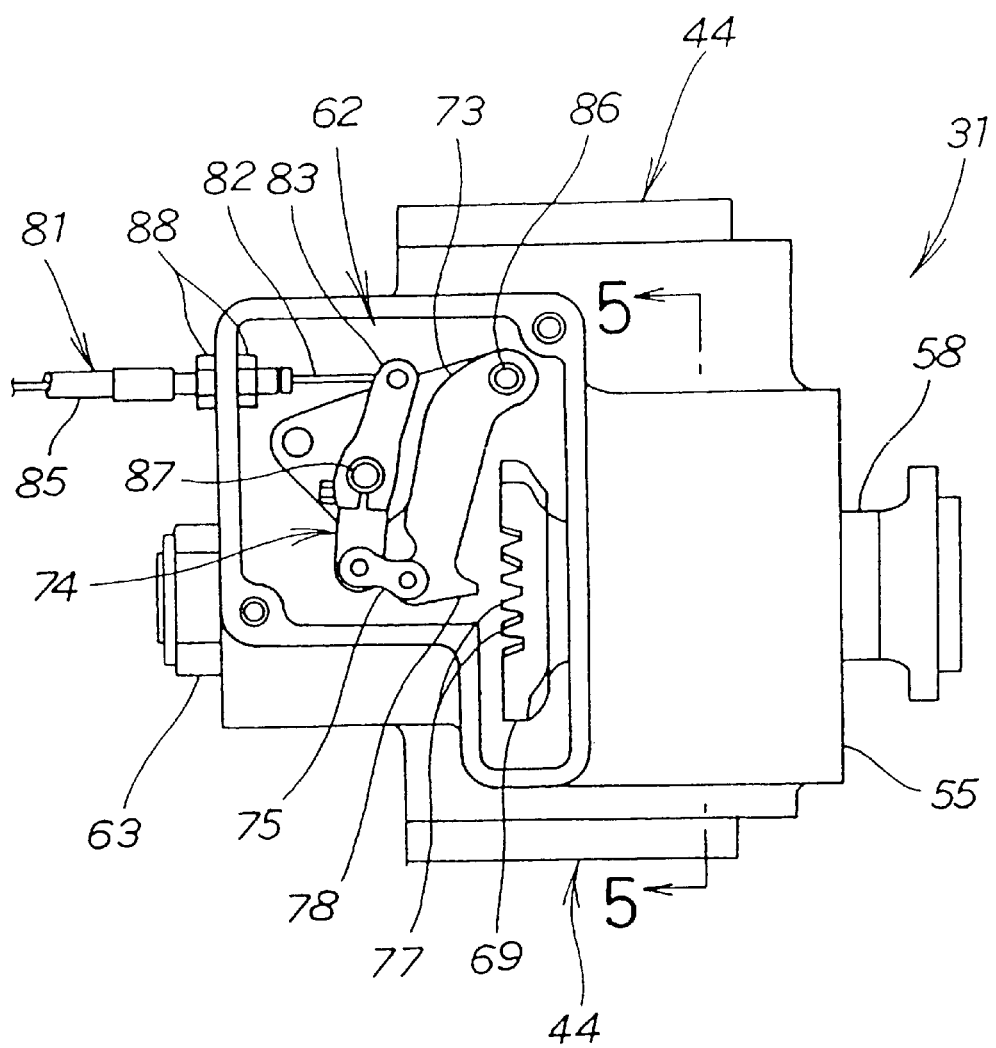
FIG. 4 is a plan view of the joint case of the tricycle according to the present invention.

FIG. 4 is a plan view of the joint case of the tricycle according to the present invention, and shows the condition where a cover provided at an upper portion of the joint case 31 is removed.

The case main body 55 is provided at its side surfaces with fitting portions 44, 44 for fitting the rear vehicle body 43 (See FIG. 2) to the joint case 31.

The roll lock mechanism 62 is a mechanism for restricting (locking) the relative rotation of the joint shaft 58 and the case main body 55. The roll lock mechanism 62 comprises the side projecting member 69 fitted to the joint shaft 58 mentioned above, a first arm-like member 73 swingably fitted to the case main body 55 for locking the rotation of the side projecting member 69, a second arm-like member 74 swingably fitted to the case main body 55 for pressing the first arm-like member 73 against the side projecting member 69, and a link member 75 provided intermediately between the first and second arm-like members 73 and 74.

The first and second arm-like members 73, 74 and the link member 75 constitute the lock member according to the third aspect of the present invention.

The side projecting member 69 comprises a tooth portion 77 . . . as the recess and projection portion, and the first arm-like member 73 is provided at its tip with a pawl portion 78 to be engaged with the tooth portion 77 . . . of the side projecting member 69.

The second arm-like member 74 is provided at its end portion with a cable fitting portion 83 for fitting an inner cable 82 constituting a roll lock cable 81.

Numeral 85 denotes an outer tube constituting the roll lock cable 81, numeral 86 denotes a swing shaft of the first arm-like member 73, numeral 87 denotes a swing shaft of the second arm-like member 74, and numerals 88, 88 denote nuts for fitting the roll lock cable 81 to the case main body 55.

Figure 5:
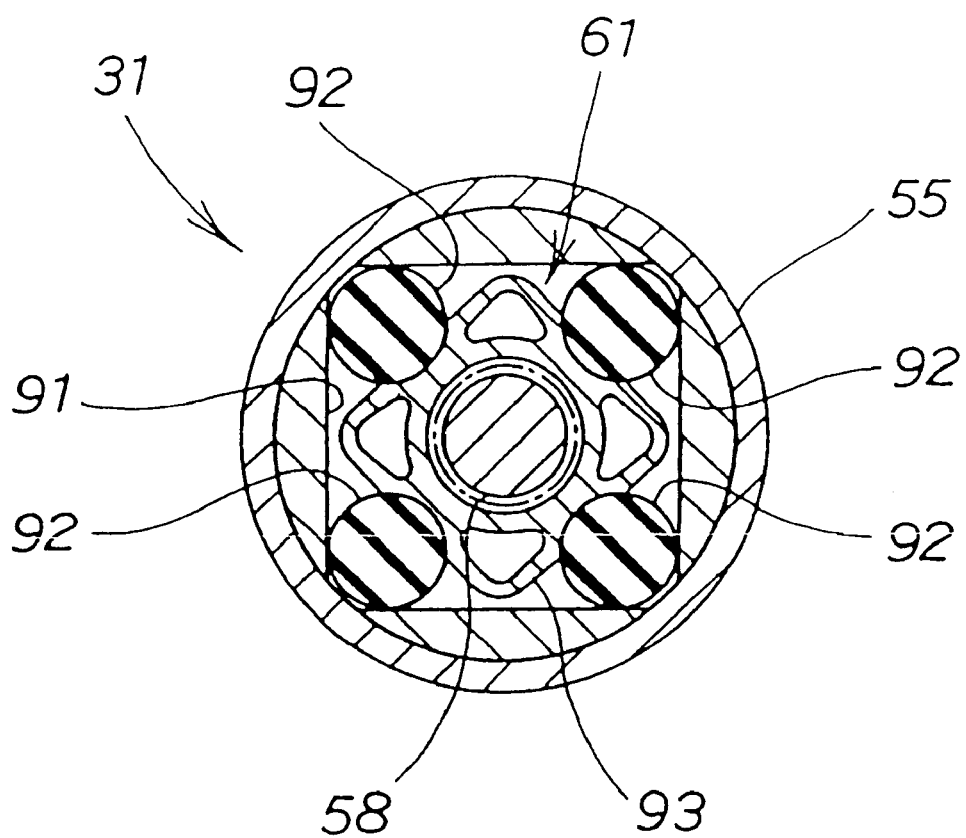
FIG. 5 is a sectional view taken along line 5—5 of FIG. 4.

FIG. 5 is a sectional view taken along line 5—5 of FIG. 4. The damper portion 61 of the joint case 31 comprises a damper containing chamber 91 provided in the case main body 55, damper rubbers 92 . . . disposed at four corners of the damper containing chamber 91, and a presser member 93 disposed on the inside of the damper rubbers 92 . . . and spline-connected to the joint shaft 58. The damper portion 61 is a so-called "Neidhart damper" such that a damper action is displayed when the presser member 93 is rotated together with the joint shaft 58 and the presser member 93 compresses the damper rubbers 92 . . .

Figure 6:
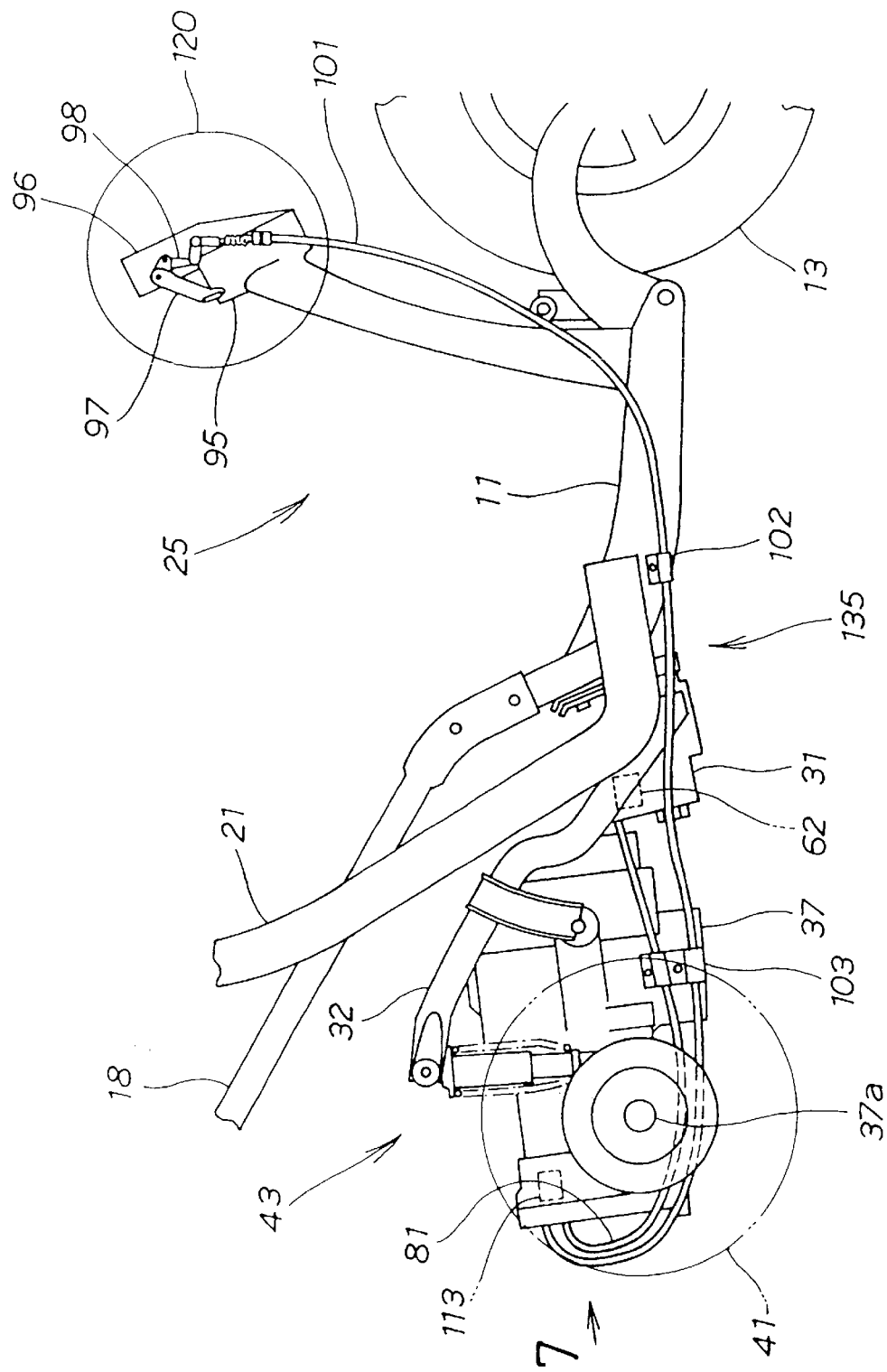
FIG. 6 is a side view showing major portions of a front vehicle body and a rear vehicle body of the tricycle according to the present invention.

FIG. 6 is a side view of major parts of the front vehicle body and the rear vehicle body of the tricycle according to the present invention, and shows the condition where a head pipe 95 for rotatably fitting a handle is provided at an upper portion of the vehicle body frame 11. A bracket 96 is fitted to a front portion of the head pipe 95. A parking lever 97 for locking the rear wheels 41, 41 (rear wheel 41 on the far side is not shown) at the time of parking is fitted to the bracket 96. A rear wheel lock cable 101 as a first cable is fitted to the parking lever 97 through a link member 98. The rear wheel lock cable 101 is extended to a rear portion of the power unit 37. The rear wheel lock cable 101 is fixed to a side portion of the vehicle body frame 11 and to a lower portion of a side portion of the power unit 37 by cable-fitting brackets 102, 103. A roll lock cable 81 as a second cable is extended from a rear portion of the power unit 37 to a rear portion of the joint case 31. Furthermore, the roll lock cable 81 is fixed to the power unit 37 together with the rear wheel lock cable 101 by the cable-fitting bracket 103. The rear wheel lock cable 101 and the roll lock cable 81 have been omitted in FIGS. 1 and 2.

Figure 7:
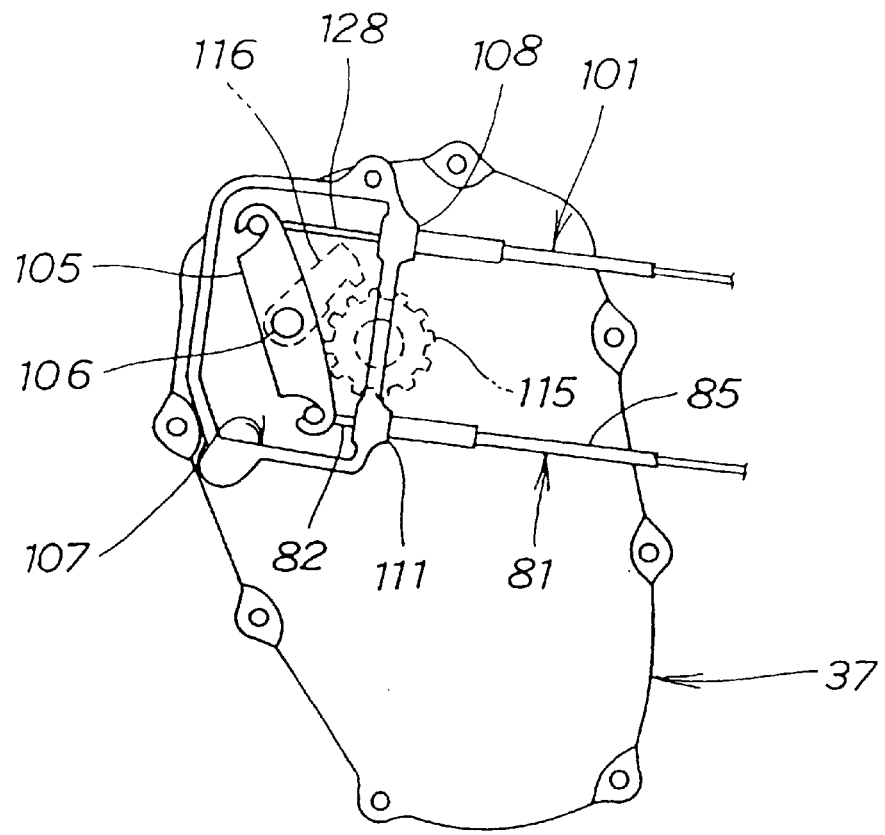
FIG. 7 is a view taken in the direction of arrow 7 of FIG. 6.

FIG. 7 is a view taken in the direction of the arrow 7 of FIG. 6. The power unit 37 is fitted at its rear portion with an operating lever 105 for locking the rear wheels. The operating lever 105 is fitted at one end with the rear wheel lock cable 101 and at its other end with the roll lock cable 81. Numeral 106 denotes a swing shaft fitted integrally to the operating lever 105, numeral 107 denotes an operating lever containing portion, numeral 108 denotes a first cable fitting portion for fitting the rear wheel lock cable 101, and numeral 111 denotes a second cable fitting portion for fitting the roll lock cable 81.

Figure 8:
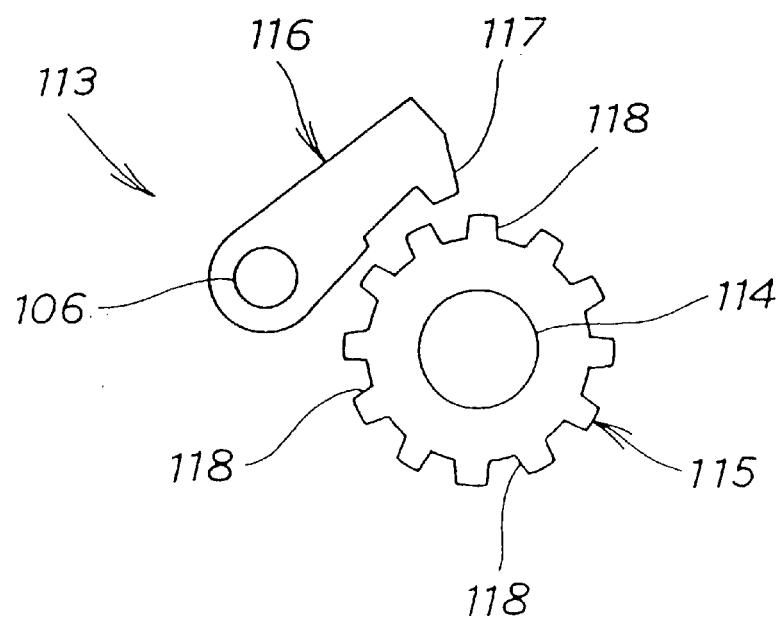
FIG. 8 is an illustration of a rear wheel lock mechanism contained in a power unit of the tricycle according to the present invention.

FIG. 8 is an illustration of a rear wheel lock mechanism contained in the power unit of the tricycle according to the present invention. The rear wheel lock mechanism 113 comprises a parking shaft 114 connected to the output shaft 37a (See FIG. 6) of the power unit 37, a parking gear 115 fitted to the parking shaft 114, and an arm-like member 116 fitted to the swing shaft 106 of the operating lever 105 for locking the rotation of the parking gear 115. With the swing shaft 106 rotated, a pawl portion 117 provided in the arm-like member 116 is engaged with a tooth portion 118 of the parking gear 115, whereby rotation of the parking shaft 114 is stopped, and the rear wheels 41, 42 (See FIG. 6) are locked through the output shaft 37a of the power unit 37.

Figure 9:
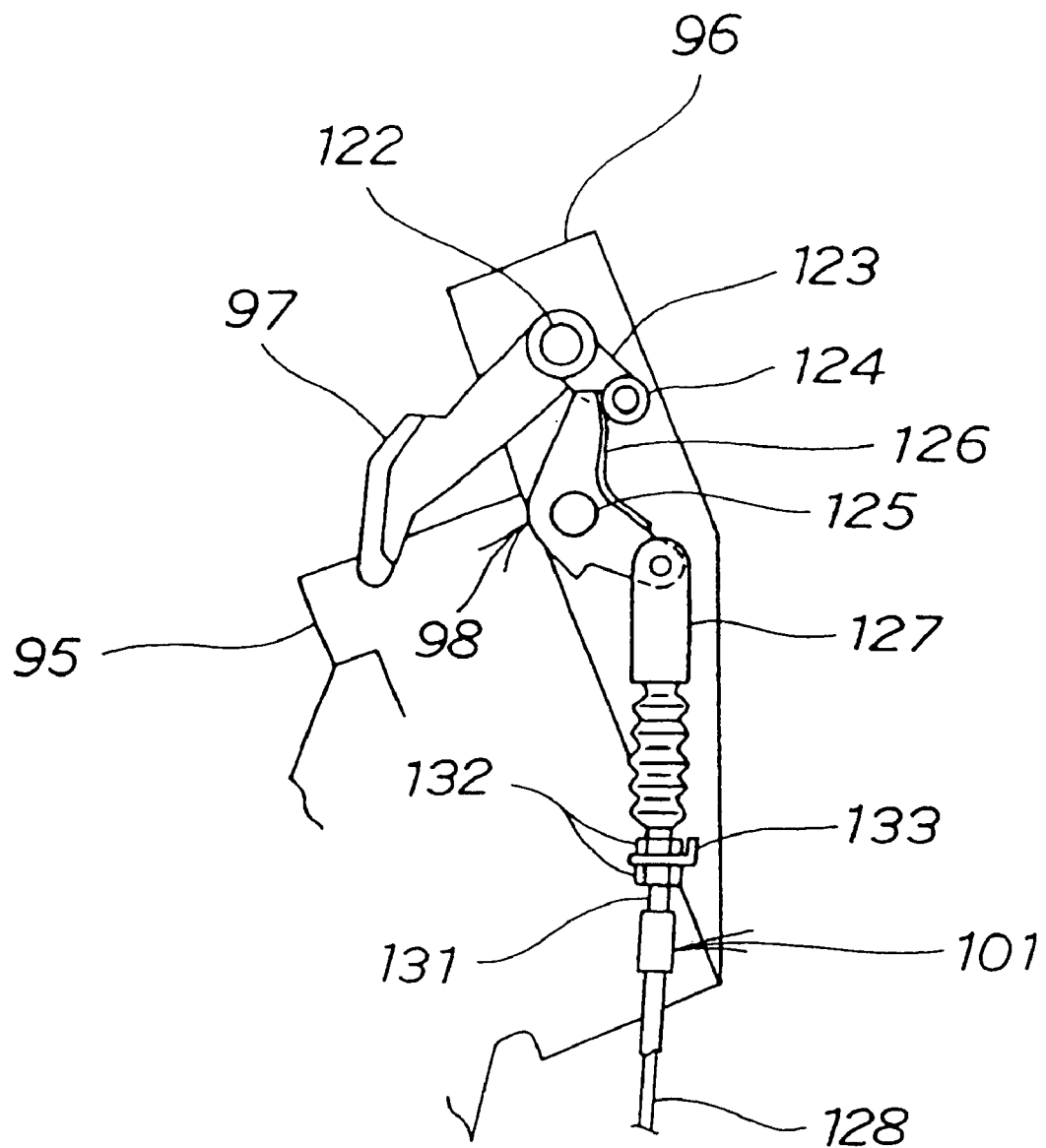
FIG. 9 is an enlarged view of part 120 of FIG. 6.

FIG. 9 is an enlarged view of part 120 of FIG. 6, and shows the condition where the parking lever 97 is fitted to the bracket 96 swingably at a swing shaft 122. Furthermore, an arm portion 123 is integrally fitted to the parking lever 97. A roller 124 is rotatably fitted to the tip end of the arm portion 123. The link member 98 is fitted to the bracket 96 swingably at a swing shaft 125. The link member 98 is provided with a curved line form edge 126 with which the roller 124 can make contact. A metal end portion 127 of the rear wheel lock cable 101 is fitted to the link member 98. An inner cable 128 constituting the rear wheel lock cable 101 is connected to the metal end portion 127. In addition, a cable fitting bracket 133 for fixing an outer tube 131 which is a component part of the rear wheel lock cable 101 by nuts 132, 132 is fitted to the bracket 96.

In FIG. 6, a parking lock device 135 for locking the rear wheels and locking the rolling comprises the constitution from the above-mentioned parking lever 97 through the rear wheel lock cable 101 to the operating lever 105 (See FIG. 7) of the power unit 37, and the constitution of the rear wheel lock mechanism 113 (See FIG. 8) and from the operating lever 105 through the roll lock cable 81 to the roll lock mechanism 62 (See FIG. 4).

The operation of the parking lock device 135 described above will now be described.

Figure 10:
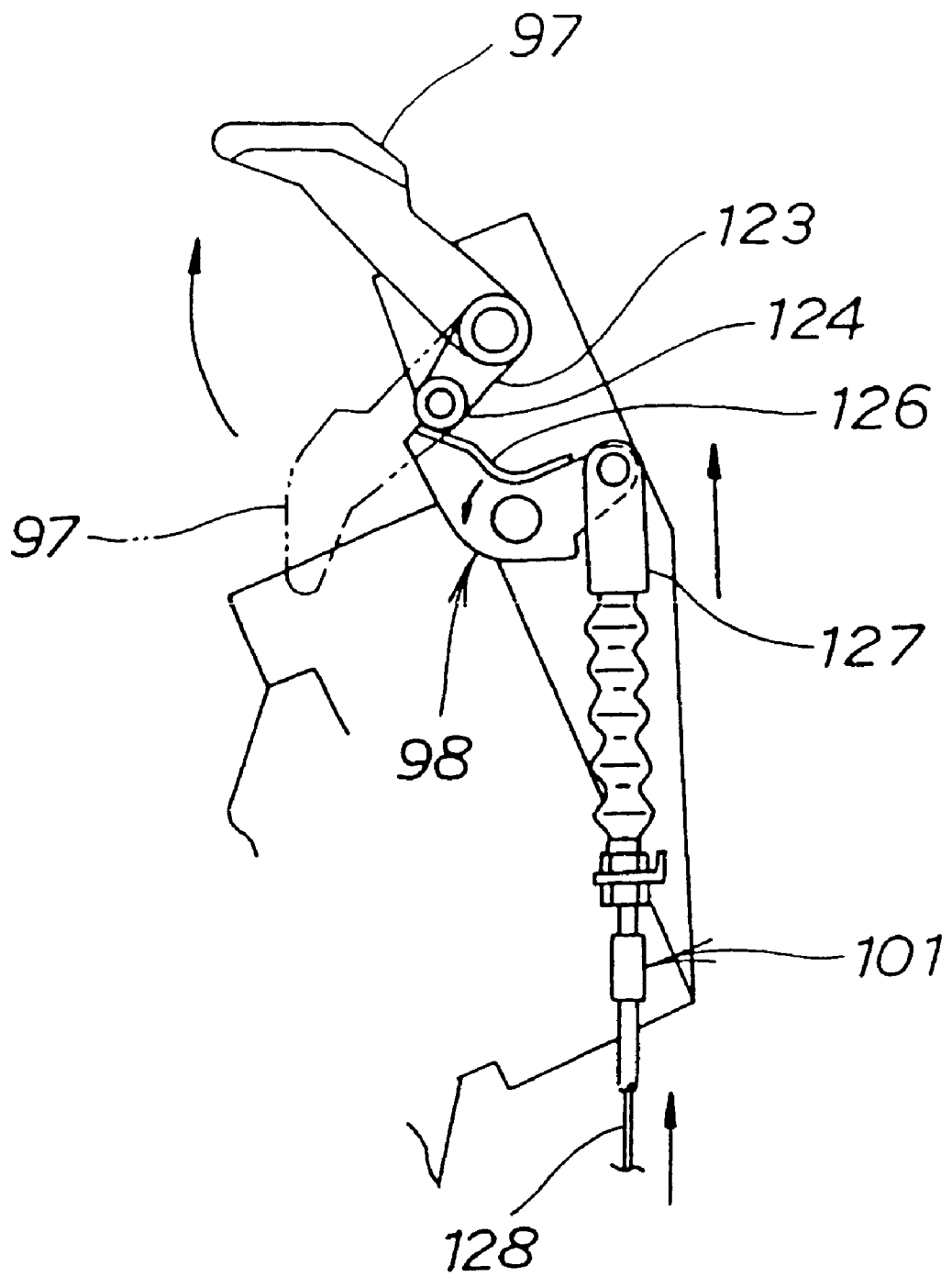
FIG. 10 is a first operational view illustrating the operation of the parking lock mechanism of the tricycle according to the present invention.

FIG. 10 is a first operational view illustrating the operation of the parking lock device of the tricycle according to the present invention.

For parking the tricycle, first, when the parking lever 97 is pulled up from the position shown by imaginary lines as indicated by an arrow, the arm portion 123 swings clockwise in accordance with the swinging of the parking lever 97, and the roller 124 retaining contact with the curved line form edge 126 of the link member 98 presses down one end of the link member 98. Accordingly, the link member 98 swings counterclockwise as indicated by an arrow, and the other end of the link member 98 is raised to pull the inner cable 128 of the rear wheel lock cable 101 through the metal end portion 127.

Figure 11:
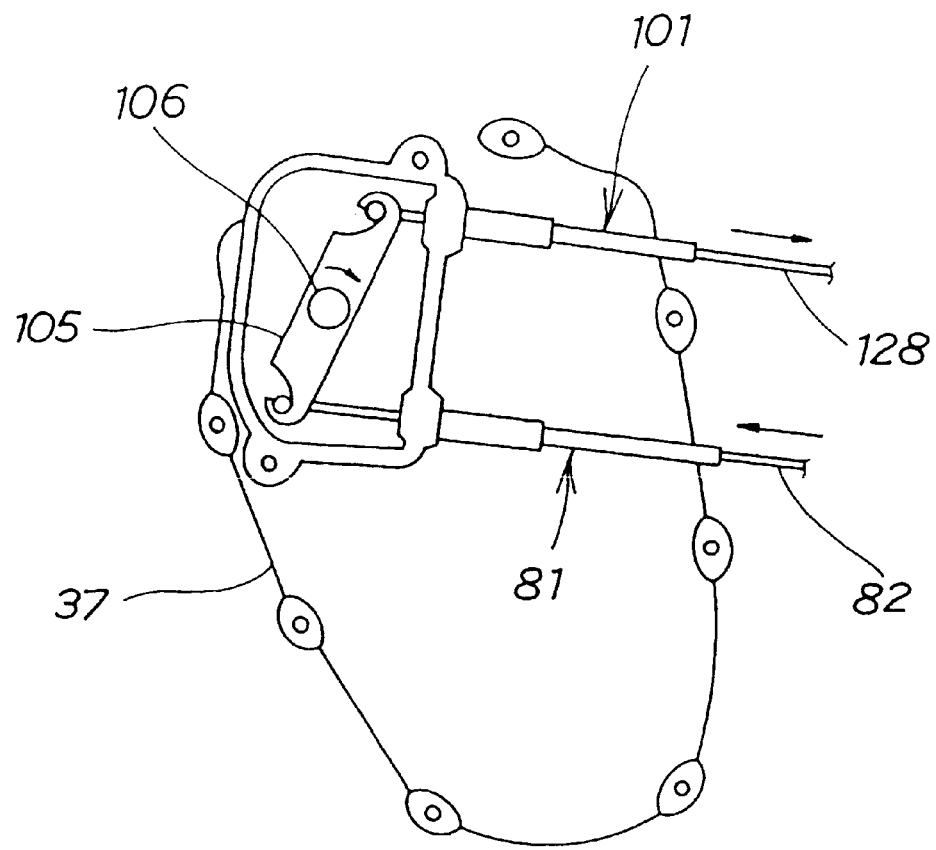
FIG. 11 is a second operational view illustrating the operation of the parking lock mechanism of the tricycle according to the present invention.

FIG. 11 is a second operational view illustrating the operation of the parking lock device of the tricycle according to the present invention.

When the inner cable 128 of the rear wheel lock cable 101 is pulled, the operating lever 105 fitted to a rear portion of the power unit 37 swings clockwise to thereby pull the inner cable 82 of the roll lock cable 81.

Figure 12:
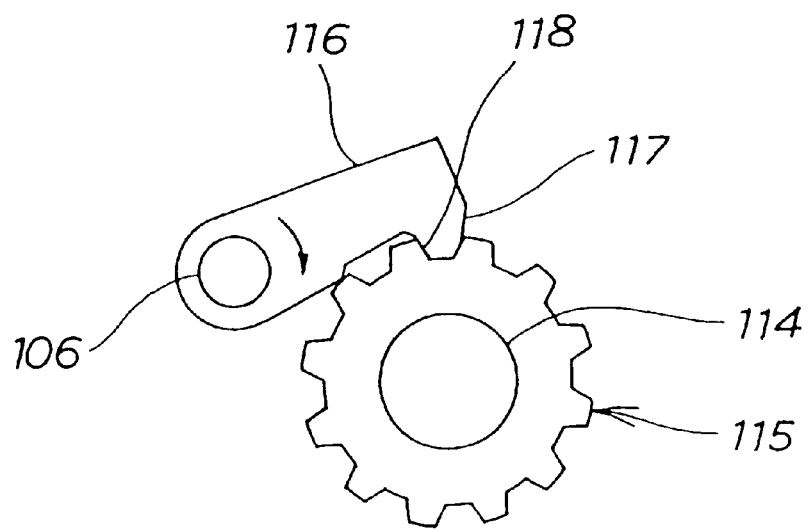
FIG. 12 is a third operational view illustrating the operation of the parking lock mechanism of the tricycle according to the present invention.

FIG. 12 is a third operational view illustrating the operation of the parking lock device of the tricycle according to the present invention.

When the operating lever 105 (See FIG. 11) swings clockwise, the swing shaft 106 is rotated to cause the arm-like member 116 to swing clockwise. Furthermore, a pawl portion 117 of the arm-like member 116 is engaged with the tooth portion 118 of the parking gear 115. Accordingly, the parking gear 115 and the parking shaft 114 cannot be rotated, the output shaft 37a of the power unit 37 shown in FIG. 6 connected to the parking shaft 114 is locked, and the rear wheels 41, 42 are locked.

Figure 13:
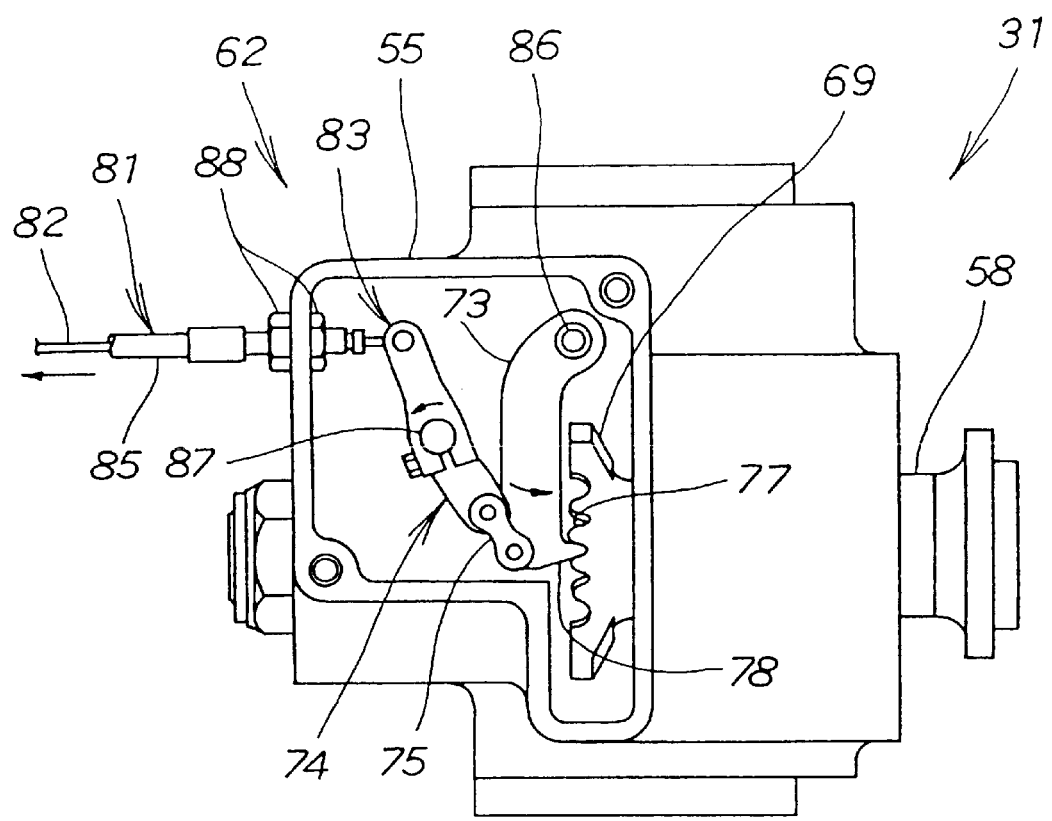
FIG. 13 is a fourth operational view illustrating the operation of the parking lock mechanism of the tricycle according to the present invention.

FIG. 13 is a fourth operational view illustrating the operation of the parking lock device of the tricycle according to the present invention.

When the inner cable 82 of the roll lock cable 81 is pulled, the second arm-like member 74 swings counterclockwise around the swing shaft 87. Furthermore, dependent on this, the first arm-like member 73 also swings counterclockwise around the swing shaft 86 through the link member 75. Accordingly, the pawl portion 78 of the first arm-like member 73 is engaged with the tooth portion 77 of the side projecting member 69. Therefore, rotation of the joint shaft 58 is locked, and relative rolling of the front vehicle body 25 and the rear vehicle body 43 shown in FIG. 6 can be locked.

Such a locking of the rolling is conducted so as to prevent the vehicle body from falling down through rolling of the front vehicle body 25 or the rear vehicle body 43 due to an unexpected cause at the time of parking of the tricycle in FIG. 2, and to prevent unnecessary forces from acting on the damper portion 61 (See FIG. 3) of the joint case 31.

As has been described above referring to FIG. 4, according to the present invention, the roll lock mechanism 62 comprises the arm-like or flange-like side projecting member 69 projecting sideways from the joint shaft 58, the first and second arm-like members 73, 74 swingably fitted to the case main body 55 to be engaged with the tooth portion 77 provided on the side projecting member 69, and the cable fitting portion 83 provided at an end portion of the second arm-like member 74 so as to fit the roll lock cable 81 for swinging the first and second arm-like members 73, 74.

With the side projecting member 69 projects sideways from the joint shaft 58, the first and second arm-like members 73, 74 and the roll lock cable 81 can be disposed at such positions as not to interfere with the joint shaft 58. Accordingly, the degree of freedom in laying out the roll lock mechanism 62 and the roll lock cable 81 can be enhanced.

Therefore, the roll lock mechanism 62 and the roll lock cable 81 can be disposed in appropriate spaces according to the shape and size of the front and rear vehicle bodies 25, 43 (See FIG. 2) and accessory parts fitted to the front and rear vehicle bodies 25, 43.

Figure 14A:
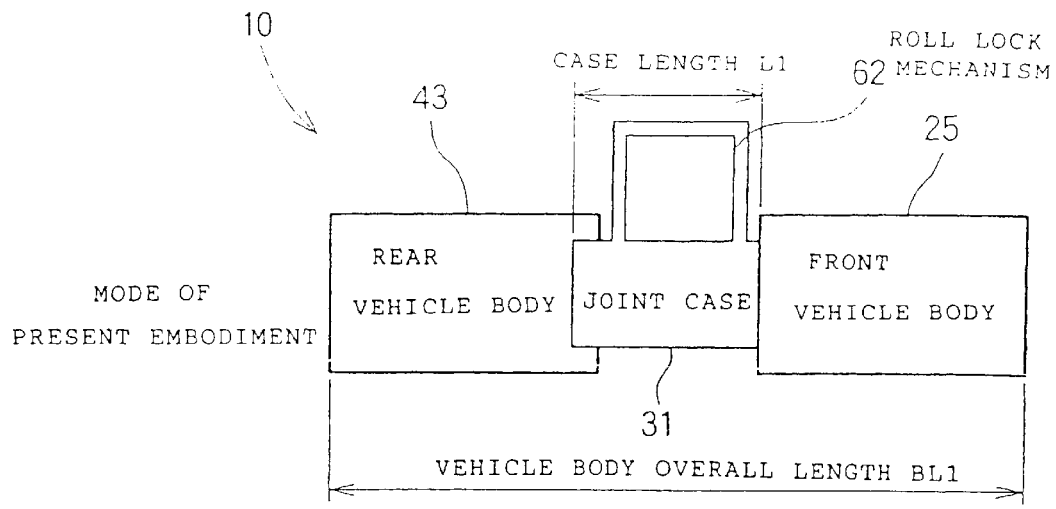
FIGS. 14(a) and 14(b) are block diagrams for comparison of the vehicle body structure of the tricycle of the present invention and a comparative example.
Figure 14B:
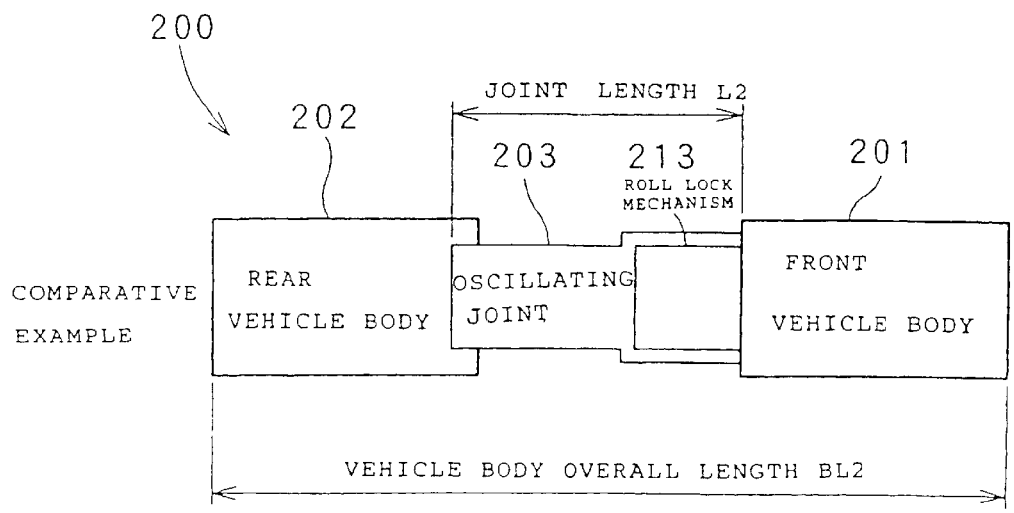

FIGS. 14(a) and 14(b) are block diagrams for comparison of the vehicle body structure of the tricycle according to the present invention and a comparative example, in which FIG. 14(a) shows the mode of the present embodiment, and FIG. 14(b) shows a comparative example.

In FIG. 14(a), the tricycle 10 is a vehicle, which comprises the front vehicle body 25, the rear vehicle body 43, and the joint case 31 for connecting the front vehicle body 25 and the rear vehicle body 43. Furthermore, the roll lock mechanism 62 is disposed on a lateral side of the joint shaft contained in the joint case 31.

The length from the front end of the front vehicle body 25 to the rear end of the rear vehicle body 43 is referred to as vehicle body overall length BL1.

In FIG. 14(b), the oscillation type tricycle 200 is a vehicle which comprises the front vehicle body 201, the rear vehicle body 202, and the oscillating joint 203 for connecting the front vehicle body 201 and the rear vehicle body 202. Furthermore, the roll lock mechanism 213 is disposed on the front side of a support shaft having a major portion contained in the oscillating joint 203.

The length from the front end of the front vehicle body 201 to the rear end of the rear vehicle body 202 is referred to as vehicle body overall length BL2.

Where the length of the joint case 31 shown in FIG. 14(a) is referred to as case length L1 and the length of the oscillating joint 203 shown in FIG. 14(b) is referred to as joint length L2, it is clear that L1<L2, so that BL1<BL2; namely, the overall length of the tricycle according to the mode of the present embodiment is shorter than the overall length of the oscillation type tricycle of the comparative example.

As has been described above referring to FIGS. 2, 14(a) and 14(b), the present invention resides in the vehicle body of the tricycle 10 comprising the front vehicle body 25 fitted with the front wheel 13 (See FIG. 1), the rear vehicle body 43 fitted with the rear wheels 41, 42, and the joint case 31 in which the front vehicle body 25 and the rear vehicle body 43 are connected by the joint shaft 58 extending substantially in the front-rear direction of the vehicle and the case main body 55 (See FIG. 3), the front vehicle body 25 and the rear vehicle body 43 being relatively rollably connected to each other by the joint case 31, characterized in that the roll lock mechanism 62 for restricting relative rotation of the joint shaft 58 and the case main body 55 is disposed on a lateral side of the joint shaft 58, and the fitting portion 44 for fitting the rear vehicle body 43 to the case main body 55 is provided on a side of the case main body 55.

With the roll lock mechanism 62 disposed on a lateral side of the joint shaft 58, the joint case 31 can be made to be shorter as compared with the conventional structure in which the roll lock mechanism is disposed on an extension of the support shaft (on the front side of the support shaft), so that the distance between the front vehicle body 25 and the rear vehicle body 43 can be reduced. Furthermore, a reduction in the overall length of the tricycle 10 can be obtained. Therefore, the wheel base of the tricycle 10 can be reduced, and sharp turn performance, or turning performance, of the tricycle 10 can be enhanced.

Furthermore, with the fitting portion 44 for fitting the rear vehicle body 43 being provided on a side of the case main body 55, the case main body 55 of the joint case 31 and the rear portion arms 32, 33 of the rear vehicle body 43 can be overlapped with each other. This results in that the overall length of the tricycle 10 can be further reduced.

Figure 15A:
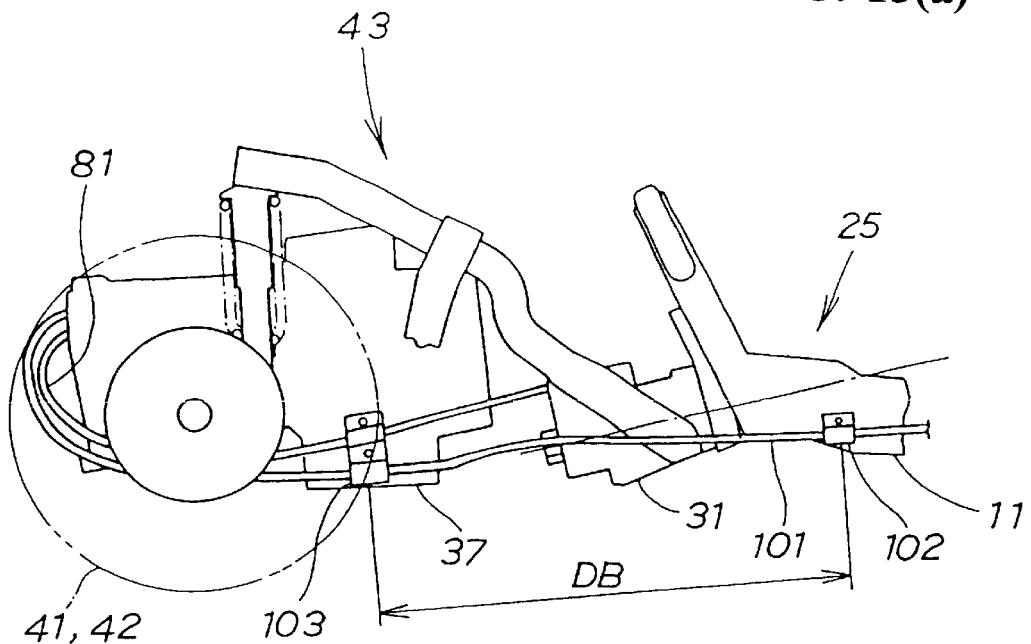
FIGS. 15(a) and 15(b) are operational views illustrating the operation of the cable of the tricycle according to the present invention.
Figure 15B:
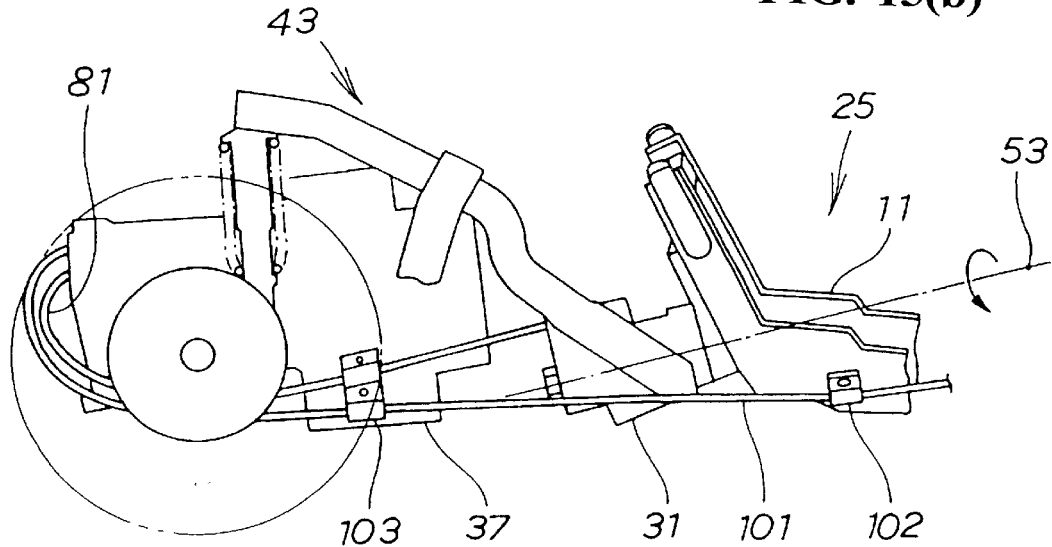

FIGS. 15(a) and 15(b) are operational views illustrating the operation of the cable in the tricycle according to the present invention.

FIG. 15(a) shows the condition where the rear wheel lock cable 101 is fixed at a side portion of the vehicle body frame 11 of the front vehicle body 25 by the cable fitting bracket 102. Furthermore, the rear wheel lock cable 101 is fixed at a side portion of a lower portion of the power unit 37 of the rear vehicle body 43 by the cable fitting bracket 103. Accordingly, the distance DB between the cable fitting brackets 102 and 103 is increased.

Figure 16:
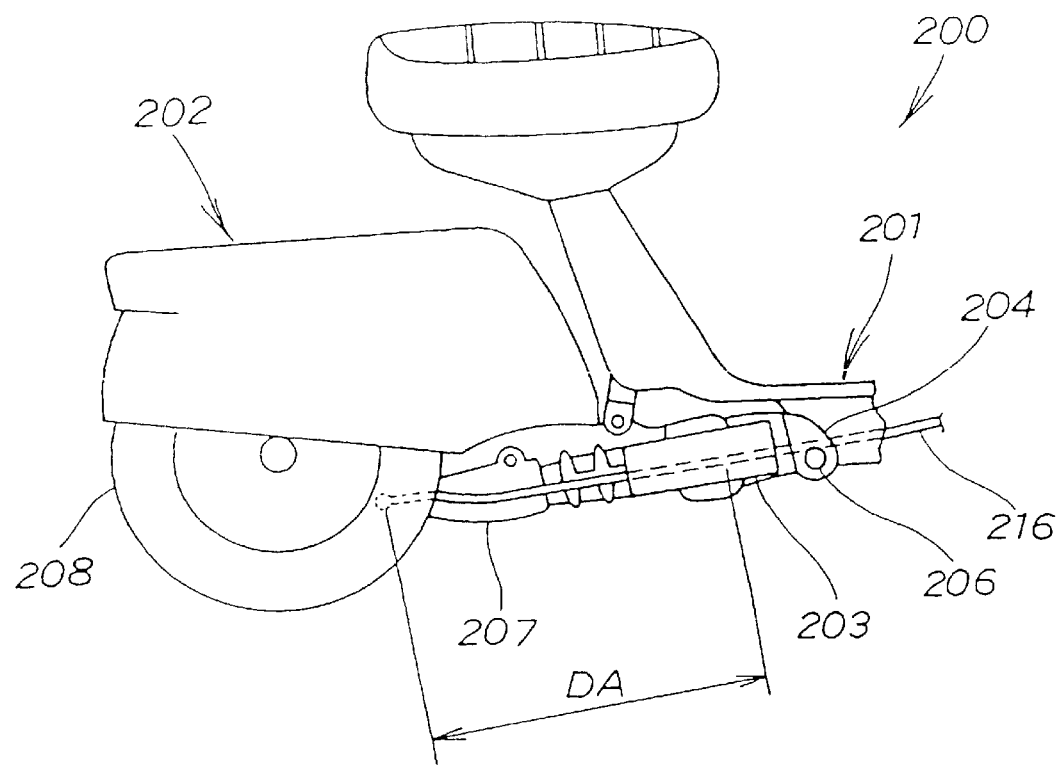
FIG. 16 is a side view of major part of a tricycle according to the background art.
Figure 17:
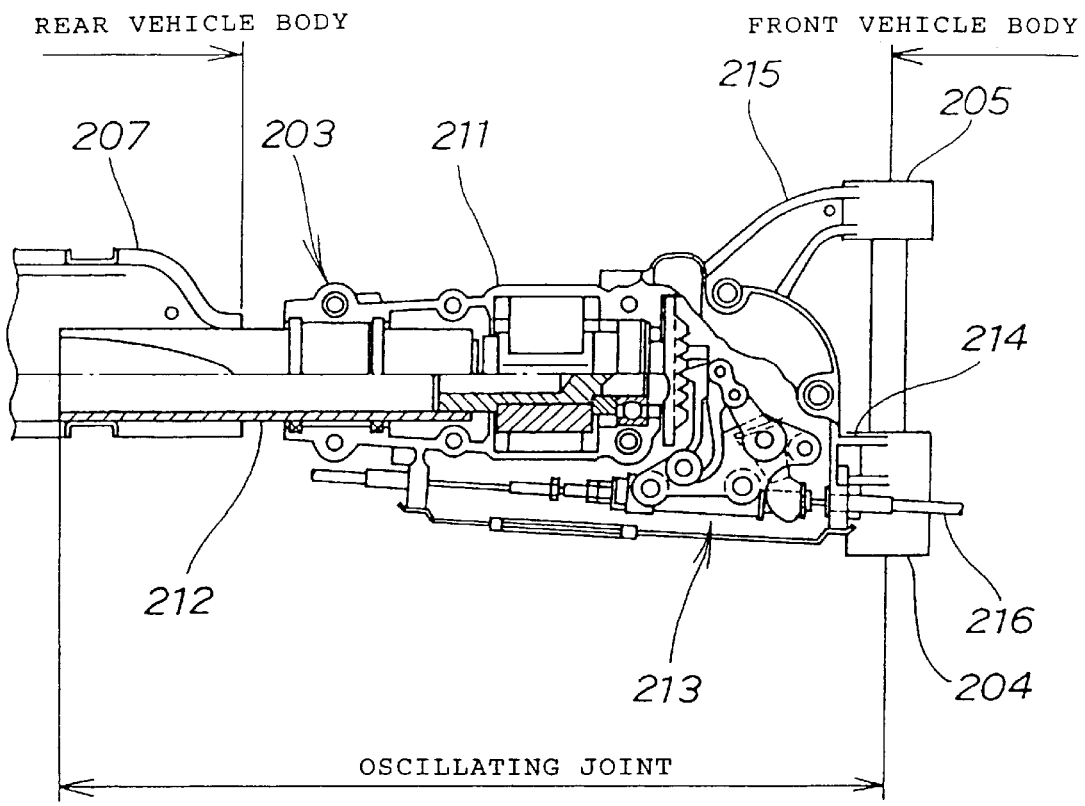
FIG. 17 is a sectional view of an oscillating joint according to the background art.

In the background art, for example, as shown in FIG. 16, the operating cable is fixed over the distance DA between the oscillating joint and a rear wheel brake device (not shown). However, according to the present invention, as shown in FIG. 15(a), the rear wheel lock cable 101 is fixed over the distance DB between the front vehicle body 25 and the rear vehicle body 43. Therefore, DB>DA, and the present invention is advantageous over the background art with respect to the torsion of the rear wheel lock cable 101.

In FIG. 15(b), for example, when the front vehicle body 25 is rolled relative to the rear vehicle body 43 as shown by an arrow with the axis 53 of the joint shaft 58 (See FIG. 3) of the joint case 31 as a center, the rear wheel lock cable 101 between the cable fitting brackets 102, 103 is twisted. However, since the distance between the cable fitting brackets 102, 103 is increased, the torsion angle of the rear wheel lock cable 101 can be decreased, and the rear wheel lock cable 101 can be prevented from being twisted.

As has been described above referring to FIG. 6 and FIGS. 15(a) and (b), the structure according to the present invention is characterized in that the rear wheel lock mechanism 113 for locking the rear wheels 41, 42 is provided on the rear vehicle body 43, the parking lever 97 is provided on the front vehicle body 25 so as to operate the rear wheel lock mechanism 113, the rear wheel lock cable 101 is laid between the parking lever 97 and the rear wheel lock mechanism 113, and the roll lock cable 81 is laid between the rear wheel lock mechanism 113 and the roll lock mechanism 62.

With the rear wheel lock cable 101 laid between the front vehicle body 25 and the rear vehicle body 43, the torsion of the rear wheel lock cable 101 due to relative rotation of the front vehicle body 25 and the rear vehicle body 43 can be absorbed over a larger distance as compared with the prior art. With this arrangement, irrational forces are not applied to the rear wheel lock cable 101. Accordingly, the rear wheel lock cable 101 is advantageous with respect to bending, the number of times of replacement of the rear wheel lock cable 101 or the like is reduced, and maintenance cost for the tricycle 10 can be reduced.

While the lock member of the roll lock mechanism 62 is constituted of the first and second arm-like members 73, 74 and the link member 75 as shown in FIG. 4 in the mode of the present embodiment, the lock member is not limited to this, but may be one arm-like member which is provided at its one end with a pawl portion and at its other end with a cable fitting portion and is swingably fitted to the case main body 55.

In addition, the tricycle according to the present invention is not limited to a tricycle having one front wheel and two rear wheels, but may be a tricycle having two front wheels and one rear wheel.

In addition, the constitution in which "the roll lock mechanism is disposed on a lateral side of the shaft" according to the second aspect of the present invention means that, since the shaft is disposed substantially in the front-rear direction of the vehicle, the roll lock mechanism may be disposed on any of the upper side, the lower side, the left side and the right side of the shaft which are lateral sides of the shaft.

The present invention, constituted as described above, displays the following effects.

In the vehicle body structure of tricycle according to the first aspect of the present invention, a connecting portion comprises a flange, a shaft extended from the flange, and a bearing fitted to the shaft. The flange is fitted to a rear portion of the front vehicle body, whereas the bearing side of the connecting portion is fitted to the rear vehicle body. Accordingly, the connecting portion can be decreased in size as compared with the background art, and a reduction in the overall length of the tricycle can be obtained.

In the vehicle body structure of tricycle according to the second aspect of the present invention, a roll lock mechanism for restricting relative rotation of a shaft and a bearing is disposed on a lateral side of the shaft. Furthermore, a fitting portion for fitting the rear vehicle body to the bearing is provided on a side of the bearing, whereby the connecting portion can be made to be shorter as compared with a conventional structure in which the roll lock mechanism is disposed on an extension of the shaft. Accordingly, the distance between the front vehicle body and the rear vehicle body can be reduced, and a reduction in the overall length of the tricycle can be obtained. Furthermore, with the above construction, turning performance of the tricycle can be enhanced.

Furthermore, by providing the fitting portion for fitting the rear vehicle body on a side of the bearing, the bearing and the rear vehicle body can be made to overlap with each other. Accordingly, a further reduction in the overall length of the tricycle can be achieved.

In the vehicle body structure of tricycle according to the third aspect of the present invention, the roll lock mechanism comprises an arm-like or flange-like side projecting member projecting sideways from the bearing, a lock member swingably fitted to the bearing so as to be engaged with a recess and projection portion provided on the side projecting member, and a cable fitting portion provided at an end portion of the lock member so as to fit a cable for swinging the lock member. Accordingly, by the side projecting member projecting sideways from the shaft, the lock member and the cable can be disposed in such positions as not to interfere with the shaft, and the degree of freedom in laying out the roll lock mechanism and the cable can be enhanced.

Therefore, the roll lock mechanism and the cable can be disposed in appropriate spaces according to the shape and size of the front and rear vehicle bodies and accessory parts fitted to the front and rear vehicle bodies.

In the vehicle body structure of tricycle according to the third aspect of the present invention, a rear wheel lock mechanism for locking the rear wheels is provided on the rear vehicle body, a parking lever is provided on the front vehicle body so as to operate the rear wheel lock mechanism, and a font half portion of the cable is laid between the parking lever and the rear wheel lock mechanism whereas a rear half portion of the cable is laid between the rear wheel lock mechanism and the roll lock mechanism. Accordingly, the torsion of the cable due to relative rotation of the front vehicle body and the rear vehicle body can be absorbed over a larger distance as compared with the prior art.

With the above construction, irrational forces are not applied to the cable, the cable becomes advantageous with respect to bending, and the number of times of replacement of the cable or the like is reduced, whereby maintenance cost for the tricycle can be suppressed.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicle body structure for a tricycle comprising:
   a front vehicle body fitted with a front wheel;
   a rear vehicle body fitted with rear wheels; and
   a connecting portion for connecting said front vehicle body and said rear vehicle body to each other for relative rotation, said connecting portion comprising:
   at least one flange, said at least one flange being fitted to a rear portion of said front vehicle body;
   a shaft extending from only one side of said flange;
   at least one bearing fitted to said shaft, said at least one bearing being fitting to said rear vehicle body;
   a roll lock mechanism for restricting relative rotation of said shaft and said at least one bearing, said roll lock mechanism being disposed on a lateral side of said shaft at an intermediate portion of said shaft; and
   a fitting portion for fitting said rear vehicle body to said at least one bearing, said fitting portion being provided on a side of said bearing.

2. The vehicle body structure for a tricycle according to claim 1, wherein said at least one bearing includes a main body and at least one separate bearing element supported by said main body, said fitting portion being formed on said main body.

3. The vehicle body structure for a tricycle according to claim 2, said connecting portion further comprising a damper portion disposed intermediate said shaft and said main body, said damper portion comprising:
   a damper containing chamber formed in said main body;
   a plurality of damper rubbers disposed within said damper containing chamber; and
   a presser member, said presser member being disposed inside of said plurality of damper rubbers and being spline connected to said shaft.

4. The vehicle body structure for a tricycle according to claim 1, said connecting portion further comprising a damper portion disposed intermediate said shaft and a main body of said connecting portion, said damper portion comprising:
   a damper containing chamber formed in said main body;
   a plurality of damper rubbers disposed within said damper containing chamber; and
   a presser member, said presser member being disposed inside of said plurality of damper rubbers and being spline connected to said shaft.

5. A vehicle body structure for a tricycle according to claim 1, wherein said roll lock mechanism comprises:
   a side projecting member projecting sideways from said shaft, said side projecting member extending from said intermediate portion of the shaft;
   a lock member swingably fitted on a side of said at least one bearing for engaging with a recess and projection portion provided on said side projecting member; and
   a cable fitting portion provided at an end portion of said lock member for fitting a cable for swinging said lock member.

6. A vehicle body structure for a tricycle according to claim 5, wherein said rear vehicle body is provided with a rear wheel lock mechanism for locking said rear wheels, said front vehicle body is provided with a parking lever for operating said rear wheel lock mechanism, and a front half portion of said cable extends from said parking lever to said rear wheel lock mechanism, and a rear half portion of said cable extends from said rear wheel lock mechanism to said roll lock mechanism.

7. A connecting portion for connecting a front vehicle body and a rear vehicle body of a tricycle for relative rotation, the front vehicle body being fitted with a front wheel and the rear vehicle body being fitted with rear wheels, said connecting portion comprising:
   at least one flange, said at least one flange being connectable to a rear portion of the front vehicle body;
   a shaft extending from only one side of said flange;
   at least one bearing fitted to said shaft, said at least one bearing being connectable to said rear vehicle body;
   a roll lock mechanism for restricting relative rotation of said shaft and said at least one bearing, said roll lock mechanism being disposed on a lateral side of said shaft at an intermediate portion of said shaft; and
   a fitting portion for connecting said rear vehicle body to said at least one bearing, said fitting portion being provided on a side of said bearing.

8. The connecting portion according to claim 7, wherein said at least one bearing includes a main body and at least one separate bearing element supported by said main body, said fitting portion being formed on said main body.

9. The connecting portion according to claim 8, further comprising a damper portion disposed intermediate said shaft and said main body, said damper portion comprising:
   a damper containing chamber formed in said main body;
   a plurality of damper rubbers disposed within said damper containing chamber; and
   a presser member, said presser member being disposed inside of said plurality of damper rubbers and being spline connected to said shaft.

10. The connecting portion according to claim 7, further comprising a damper portion disposed intermediate said shaft and a main body of said connecting portion, said damper portion comprising:
    a damper containing chamber formed in said main body;
    a plurality of damper rubbers disposed within said damper containing chamber; and
    a presser member, said presser member being disposed inside of said plurality of damper rubbers and being spline connected to said shaft.

11. A connecting portion according to claim 7, wherein said roll lock mechanism comprises:
    a side projecting member projecting sideways from said shaft, said side projecting member extending from said intermediate portion of said shaft;
    a lock member swingably fitted on a side of said at least one bearing for engaging with a recess and projection portion provided on said side projecting member; and
    a cable fitting portion provided at an end portion of said lock member for fitting a cable for swinging said lock member.

12. A vehicle body structure for a tricycle, comprising:
    a front vehicle body fitted with a front wheel;
    a rear vehicle body fitted with rear wheels; and
    a connecting portion for connecting said front vehicle body and said rear vehicle body to each other for relative rotation, said connecting portion comprising:
    a shaft and at least one bearing, said shaft extending substantially in the front-rear direction of the tricycle;
    a roll lock mechanism for restricting relative rotation of said shaft and said at least one bearing, said roll lock mechanism being disposed on a lateral side of said shaft at an intermediate portion of said shaft; and
    a fitting portion for fitting said rear vehicle body to said at least one bearing, said fitting portion being provided on a side of said bearing.

13. The vehicle body structure for a tricycle according to claim 12 wherein said roll lock mechanism comprises:
    a side projecting member projecting sideways from said shaft, said side projecting member extending from said intermediate portion of said shaft;
    a lock member swingably fitted on a side of said at least one bearing for engaging with a recess and projection portion provided on said side projecting member; and
    a cable fitting portion provided at an end portion of said lock member for fitting a cable for swinging said lock member.

14. The vehicle body structure for a tricycle according to claim 13, wherein said rear vehicle body is provided with a rear wheel lock mechanism for locking said rear wheels, said front vehicle body is provided with a parking lever for operating said rear wheel lock mechanism, and a front half portion of said cable extends from said parking lever to said rear wheel lock mechanism, and a rear half portion of said cable extends from said rear wheel lock mechanism to said roll lock mechanism.

15. The vehicle body structure for a tricycle according to claim 12, wherein said at least one bearing includes a main body and at least one separate bearing element supported by said main body, said fitting portion being formed on said main body.

16. The vehicle body structure for a tricycle according to claim 15, said connecting portion further comprising a damper portion disposed intermediate said shaft and said main body, said damper portion comprising:
    a damper containing chamber formed in said main body;
    a plurality of damper rubbers disposed within said damper containing chamber; and
    a presser member, said presser member being disposed inside of said plurality of damper rubbers and being spline connected to said shaft.

17. The vehicle body structure for a tricycle according to claim 12, said connecting portion further comprising a damper portion disposed intermediate said shaft and a main body of said connecting portion, said damper portion comprising:
    a damper containing chamber formed in said main body;
    a plurality of damper rubbers disposed within said damper containing chamber; and
    a presser member, said presser member being disposed inside of said plurality of damper rubbers and being spline connected to said shaft.

* * * * *